(No Model.) 5 Sheets—Sheet 1.
R. HITCHEN, J. T. PEARSON & T. RICHMOND.
APPARATUS FOR THE PREVENTION OF ACCIDENTS TO MACHINERY.
No. 444,357. Patented Jan. 6, 1891.
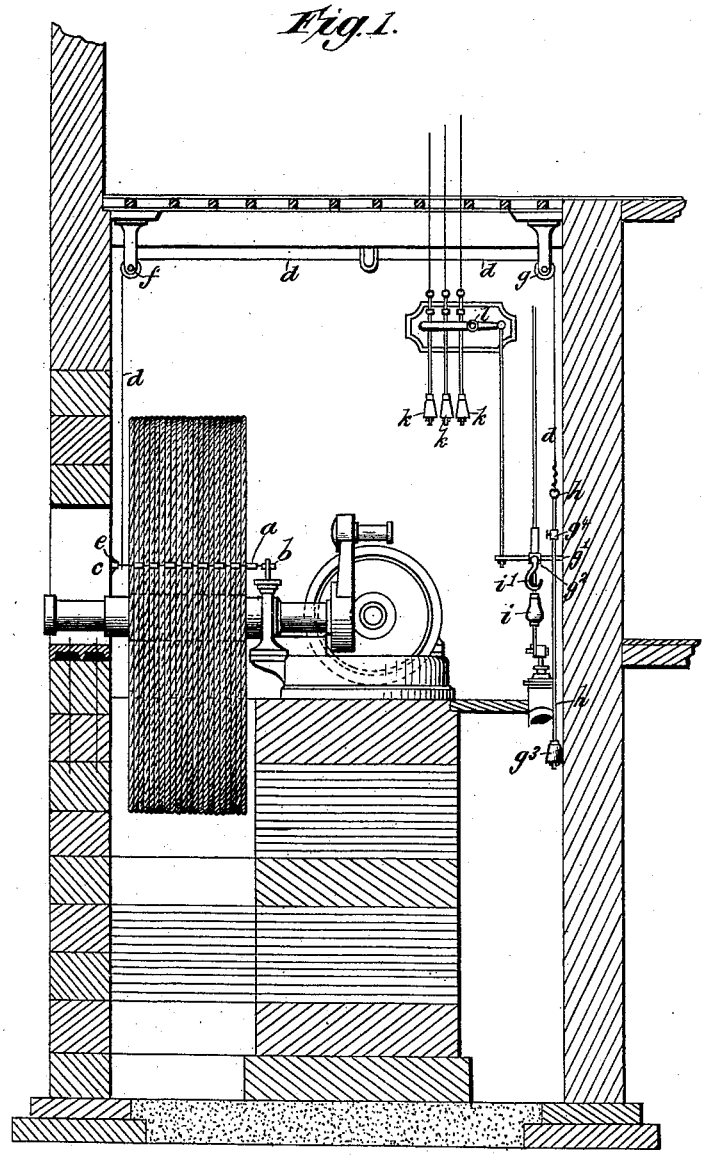

(No Model.) 5 Sheets—Sheet 2.
R. HITCHEN, J. T. PEARSON & T. RICHMOND.
APPARATUS FOR THE PREVENTION OF ACCIDENTS TO MACHINERY.
No. 444,357. Patented Jan. 6, 1891.
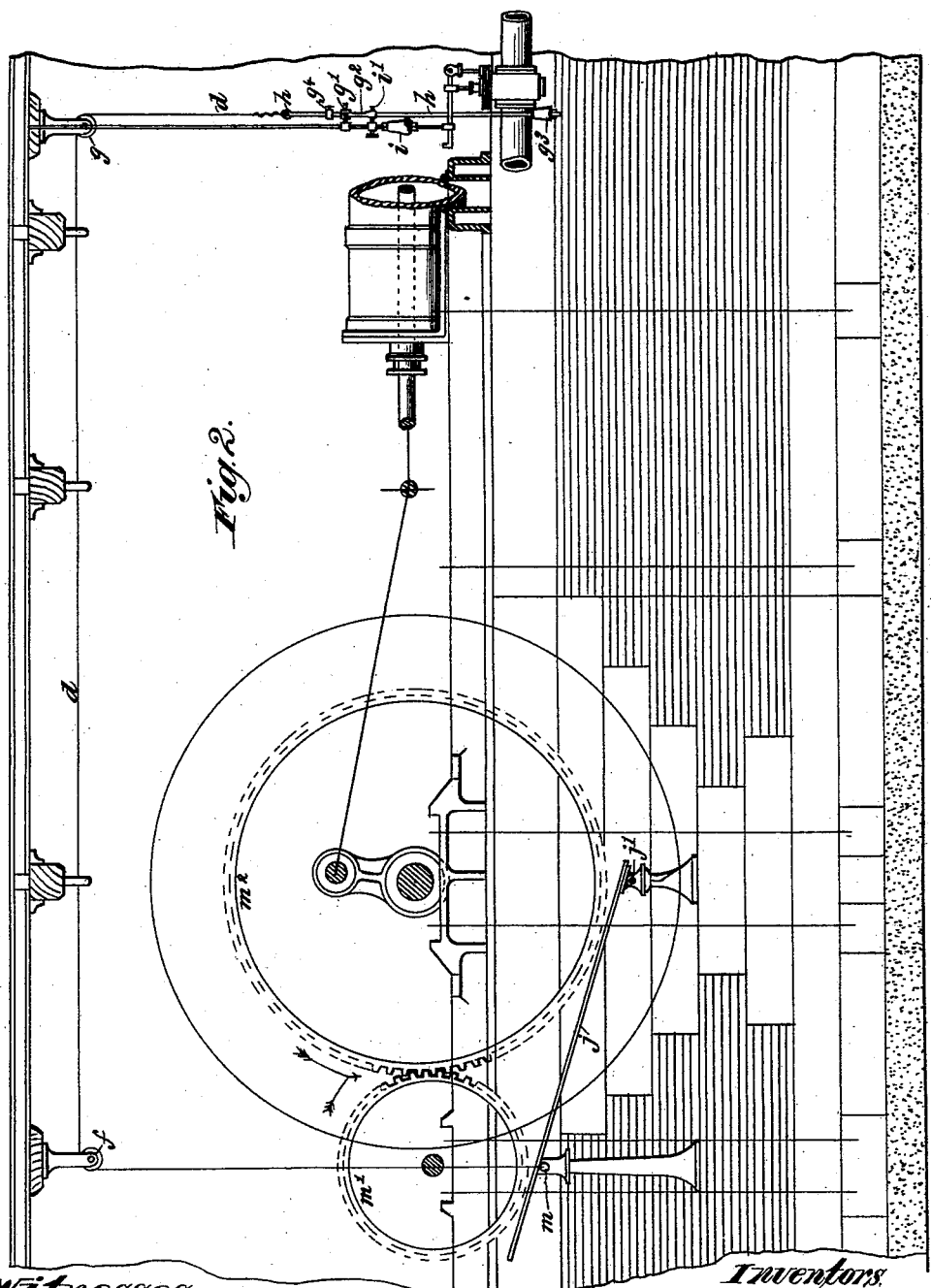

(No Model.) 5 Sheets—Sheet 3.
R. HITCHEN, J. T. PEARSON & T. RICHMOND.
APPARATUS FOR THE PREVENTION OF ACCIDENTS TO MACHINERY.
No. 444,357. Patented Jan. 6, 1891.
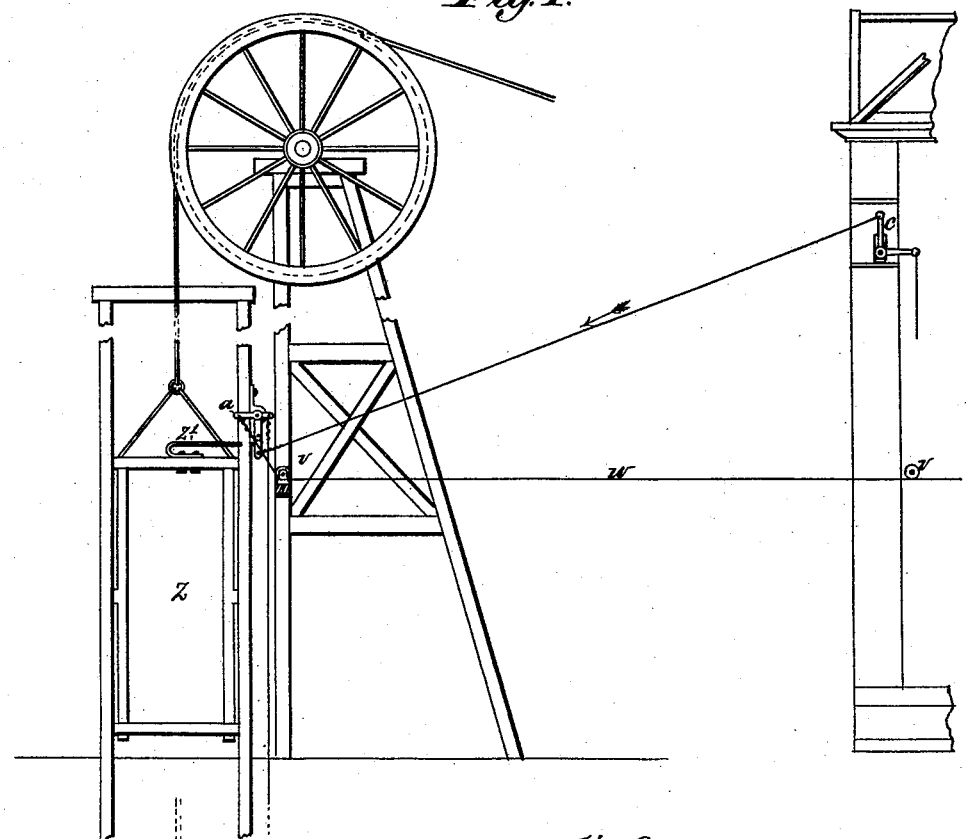
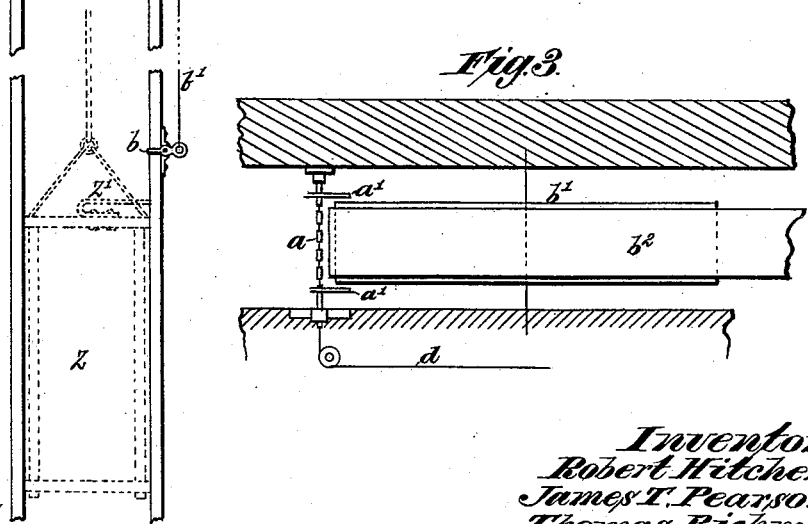

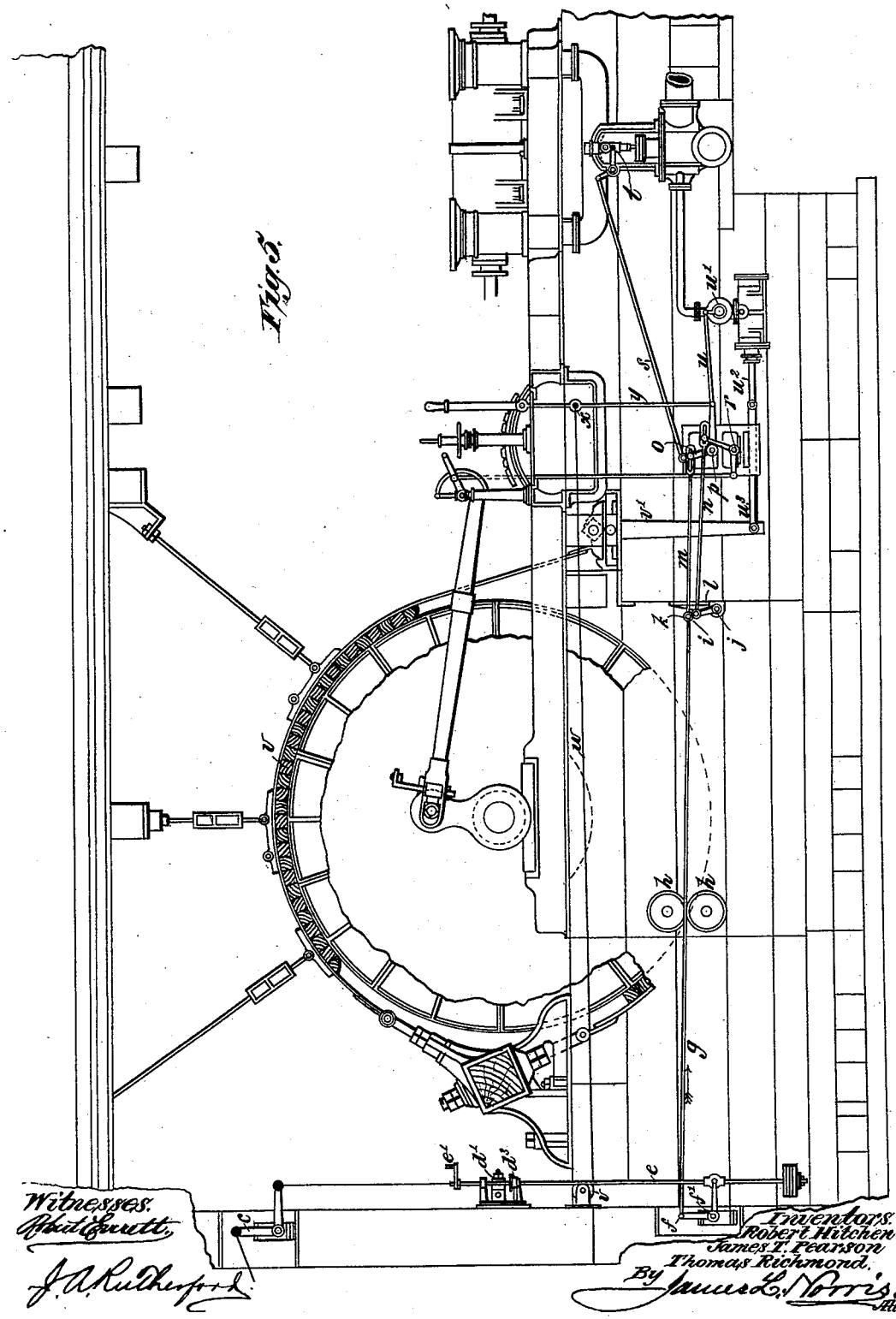

(No Model.) 5 Sheets—Sheet 5.
R. HITCHEN, J. T. PEARSON & T. RICHMOND.
APPARATUS FOR THE PREVENTION OF ACCIDENTS TO MACHINERY.
No. 444,357. Patented Jan. 6, 1891.
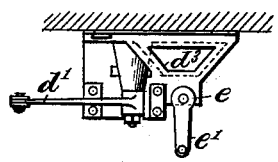
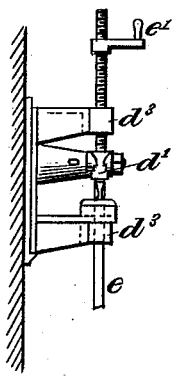
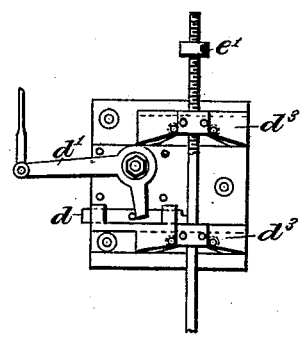
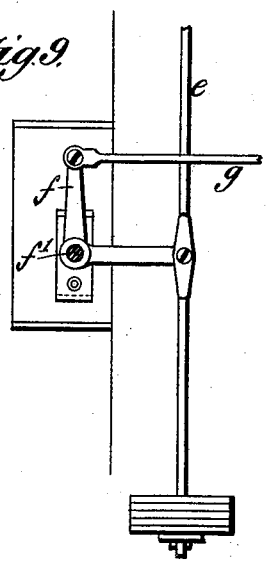
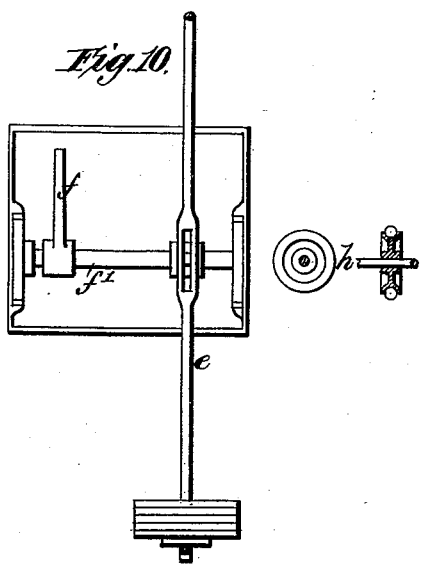
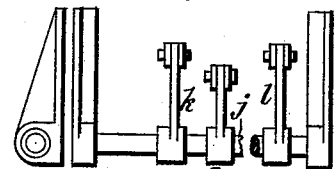
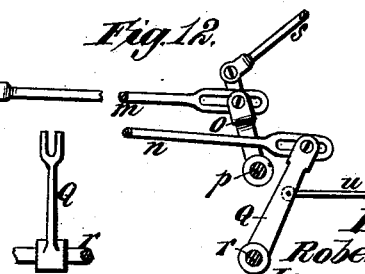
Witnesses.
Robert Everett.
J. A. Rutherford.
Inventors.
Robert Hitchen
James T. Pearson
Thomas Richmond.
By James L. Norris,
Atty.

UNITED STATES PATENT OFFICE.

ROBERT HITCHEN, JAMES T. PEARSON, AND THOMAS RICHMOND, OF BURNLEY, COUNTY OF LANCASTER, ENGLAND.

APPARATUS FOR THE PREVENTION OF ACCIDENTS TO MACHINERY.

SPECIFICATION forming part of Letters Patent No. 444,357, dated January 6, 1891.

Application filed December 3, 1889. Serial No. 332,456. (No model.) Patented in England January 5, 1885, No. 142.

*To all whom it may concern:*

Be it known that we, ROBERT HITCHEN, mill manager, JAMES TOWNSLEY PEARSON, engineer, and THOMAS RICHMOND, patent agent, subjects of the Queen of England, residing at Burnley, in the county of Lancaster, England, have invented new and useful Improvements in Apparatus for the Prevention of Accidents to Machinery and Parts Connected therewith, (for which we have received Letters Patent in England, No. 142, dated January 5, 1885,) of which the following is a specification.

This invention is designed to prevent serious accidents in rope and strap driving, in main and spur wheel driving, and in other parts of machinery in whatever portion of the mill or workshop such parts may be situated.
The invention is also applicable for the prevention of overwinding in coal-mines.

The improvements consist of a wire-like attachment in communication with the stop-valve of an engine and connected by a lever-rod or like protector placed in juxtaposition with the particular part of machinery it is designed to protect, in the manner hereinafter appearing.

In order that the invention may be properly understood and readily carried into practical effect, the accompanying drawings are hereunto attached, marked with letters of reference.

Figure 1, Sheet 1, represents the apparatus as applied for the prevention of accidents to ropes while driving machinery. $a$ is a stave or rod reduced in circumference in several places by grooves sufficiently deep that the stave or rod may be readily broken when struck crosswise, but capable of sustaining a considerable pull or strain lengthwise. This stave or rod is placed between the standards $b$ and $c$ and attached by a cord or wire at one end to $b$. A wire or rod $d$ from the other end of the rod is led through the eyelet $e$ and upward to the ceiling or roof, where it passes over pulley $f$ to pulley $g$ and attached to pendant $h$, which passes through a hole in the arm $g'$ and terminates under the floor with a weighted end $g^3$. To the said pendant and above the arm $G'$ is fixed an adjustable boss or striking-piece $g^4$, which with the pendant $h$ is suspended by the wire or cord like arrangement $d$ from the rod or stave $a$, which, in close proximity to the ropes or straps, guards and protects them, and will immediately be severed should any of the ropes show the least sign of breaking up in the shape of a broken strand or other protuberance presenting itself. Upon the severance of the rod or stave $a$ the pendant $h$ falls, strikes the arm $g'$, and disengages or severs the connection subsisting between the hook of the catch $g^2$ and stud $i'$ of the weighted link $i$, which, being liberated, falls with the valve-lever and instantly shuts off the steam. In cases where several connections are required to be established from the protectors of rope-driving arrangements situated in different parts of the mill with stop-valve of the engine, each rope-driving arrangement is provided with a rod or stave connected by a wire to one of the weighted pendants $k$, which is provided with an adjustable boss or striking-piece, which, when the rod or stave is severed by a strand or like protuberance, descends upon the lever $l$, causing its opposite end to rise and disengage the catch-lever $g^2$ and shut off the steam.

Fig. 2, Sheet 1, shows the arrangement in connection with main and spur wheels, in which arrangement the lower end of the plane J is hinged at $J'$, its upper end resting upon a light slender rod or bar supported by the standards at $m$. To this rod or bar is attached the cord or wire $d$ from the drop-pendant $h$, (seen in Figs. 1 and 2,) so that the instant either of the wheels $m'$ and $m^2$ becomes detached or broken it is thrown with sufficient force against the plane as to sever the rod and liberate the pendant $h$, which then falls upon the catch-lever $g^2$ (seen in Figs. 1 and 2) and stops the engine, as previously described.

Fig. 3, Sheet 1, is a plan view of the protector rod or feeler $a$ and wire-like connection $d$ as applied to the stop-valve for the prevention of accidents in strap-driving. In the event of leaving the drum $b'$ the strap $b^2$ will bear against one of the side prongs or fingers $a'$, secured to the rod or protector $a$, which it severs at a point where the rod is reduced in circumference, liberating the wire-like connection and allowing the pendant $k$ (seen in Fig. 1) to fall, as described in the foregoing arrangements.

In Fig. 4, Sheet 2, and Fig. 5, Sheet 3, are shown the arrangement and combination of the protector or feeler $a$ with the stop-valve of an engine for the prevention of overwinding in coal-mines. The protector or feeler $a$ is connected by a wire attachment to the vertical arm of the lever $c$, the horizontal arm of which is likewise connected by wire to the projecting arm of the lever $d'$ of an apparatus performing important functions. As this apparatus is somewhat indistinct in Fig. 5, being on too small a scale for reference, enlarged views are added on Sheet 2, of which Fig. 6 is a plan, Fig. 7 an end view, and Fig. 8 a view transverse to Fig. 7. $e'$ is a weighted pendant capable of sliding in brackets $d^3$ and of being sustained in an elevated position by the catch-bolt $d$. When, therefore, the protector or feeler $a$ (seen in Fig. 4) is struck by the spring $z'$, attached to the cage $z$, in case of an overwind the lever $d'$ is at once raised, withdrawing the bolt $d$ from a recess in the weighted pendant $e$, which, being now unsupported by the said bolt, falls, carrying with it the horizontal arm fixed to shaft $f'$. (Seen in Figs. 5, 9, and 10, Fig. 9 being a view transverse to Fig. 10.) With the lowering movement of the horizontal arm the vertical arm $f$ (seen in Figs. 5, 9, and 10) is moved forward, carrying with it rod $g$ and lever $i$, secured to shaft $j$, to which are also secured levers $k$ and $l$. (Seen in Figs. 5 and 11.) The ends of the rods $m$ and $n$, at their connection with levers O and Q, fixed to shafts $p$ and $r$, (seen in Figs. 5 and 12,) are slotted in order to permit the engine-man to work the stop-valve in the usual manner without interference unless an overwind is imminent. In case of an overwind the bolt $d$ is withdrawn from the recess in the weighted pendant $e$, which falling causes the rods $g$, $m$, $n$, $s$, and $u$ to shoot forward and shut off the steam from the engine by the stop-valve $t$ and simultaneously open valve $u'$ to apply steam to ram $u^2$, so as to actuate the brake $v$ through the medium of the connecting-link $v^3$ and lever $v'$, bringing the engine to a sudden state of rest. After an overwind the pendant $e$ is readjusted by the handle $e'$, which, in being screwed down and bearing against the bracket $d^3$, raises the said pendant to allow the catch-bolt $d$ to be reinserted. The handle $e'$ is then wound back for the pendant to be again in readiness for another overwind.

When the distance between the point of unloading at the pit-mouth and the under side of the head-gear is limited, an additional part is applied to the apparatus, as seen in Fig. 4, Sheet 2, consisting of lever $b$, situated at a suitable distance below the pit's mouth. The said lever is connected to the protector or feeler $a$ by wire or rod $b'$, as seen in Fig. 4, this portion of the apparatus being so applied and connected that if the hand-levers of the stop-valve are not gradually applied by the engine-man to reduce the speed before spring $z'$ of the cage $z$ reaches the lever $b$ the said hand-levers are actuated for him to shut the stop-valve and apply the steam-brake, simultaneously bringing the engine to a sudden state of rest. When, however, the engine-man actuates his hand-levers properly, the lever $b$ is drawn out of the way of the ascending cage. For this purpose the horizontal arm of the protector-lever $a$ (seen in Fig. 4, Sheet 2) is connected by the wire $w$ to the lower arm of the setting-on lever, (seen in Fig. 5, Sheet 3,) to which it is attached at $x$. Suitable guide-pulleys $h$ and $v$ may be used to support and guide the rod $g$ and the wire connection $w$.

From the wire-like connections $d$ represented in the various foregoing arrangements may be suspended rope-pulls situated in any suitable part of the mill or workshop or near the mouth of a coal-pit, and in such a manner that should an accident arise likely to be of a serious nature to machinery or to persons becoming entangled therein the same may be readily seized by any of the workpeople to stop the engine, as previously described.

Having thus fully described our invention, what we desire to secure by Letters Patent is the following:

1. In combination with the driving mechanism of a machine, the protector-rod $a$, located in juxtaposition with the part to be protected and in communication with a stop-valve, substantially as described.

2. In combination with the driving mechanism of a machine and a stop-valve, the rod or protector $a$ and pivotal plane $j$, substantially as described.

3. The combination, with the driving mechanism of a machine and a stop-valve, of a grooved protector-rod located in juxtaposition to the part to be protected and connected with the stop-valve, substantially as described.

In testimony whereof we affix our signatures in presence of two witnesses.

ROBERT HITCHEN.
JAS. T. PEARSON.
THOS. RICHMOND.

Witnesses:
 CHAS. R. ALLEN,
 J. WESLEY C. STAFFORD.